United States Patent
Dechoux

(10) Patent No.: US 9,804,261 B2
(45) Date of Patent: Oct. 31, 2017

(54) VEHICLE RADAR INSTALLATION STRUCTURE AND FASCIA RETAINER

(71) Applicant: Autoliv Development AB, Vårgårda (SE)

(72) Inventor: Bernald Dechoux, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/036,674

(22) PCT Filed: Oct. 20, 2014

(86) PCT No.: PCT/JP2014/077840
§ 371 (c)(1),
(2) Date: May 13, 2016

(87) PCT Pub. No.: WO2015/072289
PCT Pub. Date: May 21, 2015

(65) Prior Publication Data
US 2016/0291151 A1    Oct. 6, 2016

(30) Foreign Application Priority Data
Nov. 14, 2013    (JP) ................. 2013-236048

(51) Int. Cl.
*B60R 19/48*    (2006.01)
*G01S 13/93*    (2006.01)
(Continued)

(52) U.S. Cl.
CPC .......... *G01S 13/931* (2013.01); *B60R 19/483* (2013.01); *B60R 2019/1886* (2013.01);
(Continued)

(58) Field of Classification Search
CPC ............. G01S 13/931; G01S 2019/886; G01S 2007/027; G01S 2013/9375;
(Continued)

(56) References Cited

U.S. PATENT DOCUMENTS

| 3,794,997 A | 2/1974 | Iwatsuki et al. |
| 6,508,325 B1 | 1/2003 | Schwarz et al. |

(Continued)

FOREIGN PATENT DOCUMENTS

| EP | 2 006 162 A1 | 12/2008 |
| JP | 2007-030534 A | 2/2007 |

(Continued)

OTHER PUBLICATIONS

PCT International Search Report—dated Nov. 4, 2014.
European Search Report for EP 14 86 2318.4, dated May 15, 2017.

*Primary Examiner* — Lori L Lyjak
(74) *Attorney, Agent, or Firm* — Brinks Gilson & Lione

(57) ABSTRACT

An automotive radar installation structure that allows a radar main body to be assembled to a vehicle in a simple arrangement and with stable performance, and a fascia retainer to attach a bumper fascia as an exterior part of a bumper to the vehicle. The structure includes a flat solid shape radar main body 122 and a transmission and/or reception surface to transmit/receive radio waves, and a fascia retainer 120 to attach a bumper fascia 108 of a rear bumper 104 of the vehicle to the vehicle main body. The fascia retainer 120 has a fixation portion 150, and a radar installation portion 128 in the vicinity of the fixation portion 150 having a recessed shape to receive the radar main body 122 so that the transmission and/or reception surface 130 faces outward of the vehicle.

16 Claims, 7 Drawing Sheets

(51) Int. Cl.
*B60R 19/18* (2006.01)
*G01S 7/02* (2006.01)

(52) U.S. Cl.
CPC . *G01S 2007/027* (2013.01); *G01S 2013/9375* (2013.01); *G01S 2013/9378* (2013.01); *G01S 2013/9385* (2013.01); *G01S 2013/9389* (2013.01)

(58) Field of Classification Search
CPC ..... G01S 2013/9378; G01S 2013/9385; G01S 2013/9389; B60R 19/483
See application file for complete search history.

(56) References Cited

U.S. PATENT DOCUMENTS

| | | |
|---|---|---|
| 8,744,743 B2 | 6/2014 | Kawasaki et al. |
| 9,038,876 B2 * | 5/2015 | Aleem ...................... B60R 9/06 224/489 |
| 9,348,014 B2 * | 5/2016 | Lee ....................... G01S 17/936 |
| 9,400,328 B2 * | 7/2016 | Hsiao ..................... G01S 13/42 |
| 2008/0315050 A1 | 12/2008 | Buckley et al. |
| 2014/0368375 A1 * | 12/2014 | Baftiu ................... H01Q 17/00 342/70 |

FOREIGN PATENT DOCUMENTS

| | | |
|---|---|---|
| JP | 2010-066092 A | 3/2010 |
| JP | 2011-199732 | 6/2011 |

\* cited by examiner

| Sensor Location | Speed (kph) | Peak to Peak Vib. (mm) |
|---|---|---|
| COMPARATIVE EXAMPLE | 120 | -1.5 |
| EMBODIMENT | 120 | -0.5 |

VEHICLE RADAR INSTALLATION STRUCTURE AND FASCIA RETAINER

CROSS REFERENCE TO RELATED APPLICATIONS

This application claims priority to Japanese Application No. 2013-236048, filed on Nov. 14, 2013 and PCT/JP2014/077840, filed on Oct. 20, 2014.

BACKGROUND OF THE INVENTION

Field of the Invention

The present invention relates to an automotive radar installation structure for installing a radar main body in the vicinity of a bumper of a vehicle, and to a fascia retainer used to attach a bumper fascia as an exterior part of the bumper to a main body of the vehicle.

In recent years, passenger vehicles provided with an automotive radar have become widely available. The automotive radar measures distances to other vehicles, obstacles, and so on from the vehicle and their directions relative to the vehicle and serves to assist in changing lanes or braking for collision avoidance. In addition, the automotive radar is used to issue a certain kind of warning to a driver or control various automotive devices such as seatbelts and airbags. The automotive radar is installed using a radar bracket or the like in a location invisible from the outside such as on the inner side of an exterior part at the front or rear of the vehicle (see for example Japanese Patent No. 2011-199732).

With constant progress in automotive development and improvement today, there is a demand for an automotive radar that can be installed in a simpler arrangement and with less man-hours than the automotive radar described above. Stable radar performance is also desired. However, a separate component such as a radar bracket is necessary for installing such an automotive radar at present as described above, and man-hours according to such assembling are required. It would not be easy to provide any measure to keep the performance of an automotive radar stable when the radar is installed in a location surrounded by exterior parts of the vehicle.

SUMMARY

The present invention is directed to a solution to the problem and it is an object of the present invention to provide an automotive radar installation structure and a fascia retainer that allow a radar main body to be assembled in a simple arrangement and can also contribute to stable radar performance.

In order to solve the above-described problem, an exemplary automotive radar installation structure according to the present invention includes a radar main body formed in a flat solid shape and having a transmission and/or reception surface provided at one surface to transmit and/or receive a radio wave, and a fascia retainer used to attach a bumper fascia to a main body of a vehicle. The bumper fascia is an exterior part of a bumper at the rear or front of the vehicle, and the fascia retainer includes a fixation portion fixed to the vehicle main body, and a radar installation portion having a recessed shape into which the radar main body is fitted so that the transmission and/or reception surface of the radar main body faces outward of the vehicle.

In the above-described structure, the radar installation portion for the radar main body is provided integrally with the fascia retainer as compared to an arrangement in which the radar main body is assembled to the vehicle using a radar bracket as a separate part. Therefore, the structure is simple as compared to the conventional arrangement, and the man-hours for assembling may be reduced. In addition, the fascia retainer itself is directly secured to the vehicle main body, so that vibrations are unlikely, and therefore providing the radar installation portion at the fascia retainer can reduce the effect of vibrations upon the radar performance. The above-described structure therefore allows the radar main body to achieve stable radar performance.

The above-described bumper fascia may include a front part that extends in a vehicle width-wise direction along a front or back surface of the vehicle main body, and a side part that extends from each end of the front part along a side of the vehicle main body, and the fascia retainer may have an elongated shape that extends in a front-back direction of the vehicle along an upper edge of the side part of the bumper fascia. In this structure, the bumper fascia may have a vicinity of its upper end secured to the vehicle by the fascia retainer, and the vibrations of the bumper fascia can be optimally reduced. Furthermore, the vibrations of the bumper fascia are reduced, and relative vibrations are hardly generated between the radar main body and the bumper fascia, so that radar performance by the radar main body can be more stable.

The above-described radar installation portion may be provided in the vicinity of the fixation portion. The vibrations of components are particularly unlikely at the fixation portion that is a fixing point to the vehicle main body, and thus providing the radar installation portion in the vicinity of the location can reduce the effect of vibrations upon the radar main body. Therefore, in the above-described structure, the radar performance by the radar main body can be even more stable.

The above-described radar installation portion may include at least one support that supports the radar main body in an immovable manner by contacting an edge of the transmission and/or reception surface or a side of the radar main body. In this way, the radar installation portion is configured to support the radar main body in an immovable manner using the support. In this structure, the radar main body may be installed while a large part of the transmission and/or reception surface of the radar main body can be left uncovered other than in a location contacted by the support. Therefore, the parts that can interfere with radio waves are reduced, so that the radar main body can achieve sufficient radar performance.

The above-described support may include a stopper that holds down the edge of the transmission and/or reception surface or the side of the radar main body. In addition, the support may include a bridge portion that extends over the radar main body and holds down the edge of the transmission and/or reception surface. Using the stopper and bridge portion, supports with reduced interference with radio waves from the radar main body can be implemented.

The above-described radar installation portion may have an insertion opening from which the radar main body is inserted in a direction parallel to the transmission and/or reception surface, and a slope provided in a prescribed location of a bottom in contact with a back surface of the radar main body on an opposite side to the transmission and/or reception surface to guide the radar main body further into the insertion opening in an insertion direction. Providing the insertion opening and the slope allows the radar main body to be more readily installed at the radar installation portion.

The automotive radar installation structure may further include a case that stores the radar main body, and the radar main body may be fitted into the radar installation portion through the case. The radar main body may be assembled to the radar installation portion effectively through a prescribed case. Note that the case may be assembled to the radar installation portion by screw-clamping or using for example a prescribed hook.

The above-described case may have at least one support that supports the radar main body in an immovable manner by contacting an edge of the transmission and/or reception surface or a side of the radar main body. Using the support, the case may support the radar main body in an immovable manner. In this structure, the radar main body may be installed while a large part of the transmission and/or reception surface of the radar main body is left uncovered other than in a location contacted by the support. Therefore, the parts that can interfere with radio waves are reduced, so that the radar main body can achieve sufficient radar performance.

The above-described support may include a stopper that holds down the edge of the transmission and/or reception surface or the side of the radar main body. The support may include a bridge portion that extends over the radar main body and holds down the edge of the transmission and/or reception surface. Using the stopper and bridge portion, a support with reduced interference with radio waves from the radar main body can be implemented.

The above-described case may have an insertion opening from which the radar main body is inserted in a direction parallel to the transmission and/or reception surface, and a slope provided in a prescribed location of a bottom in contact with a back surface of the radar main body on an opposite side to the transmission and/or reception surface to guide the radar main body further into the insertion opening in an insertion direction. Providing the insertion opening and the slope allows the radar main body to be more readily installed at the radar installation portion.

In order to solve the above-described problem, an exemplary fascia retainer structure according to the present invention is used to attach a bumper fascia to a main body of a vehicle, the bumper fascia is an exterior part of a bumper at the rear or front of the vehicle, and the fascia retainer includes a fixation portion fixed to the vehicle main body, and a radar installation portion having a recessed shape to which the radar main body is fitted so that a transmission and/or reception surface of the radar main body in a flat solid shape faces outward of the vehicle.

The above-described fascia retainer has the integrally provided radar installation portion for the radar main body. Using the fascia retainer, the necessity of using a radar bracket, i.e., a separate part is eliminated. Therefore, the vehicle may have a simpler structure than the conventional arrangement, and the man-hours for assembling may be reduced. In addition, the fascia retainer itself is directly secured to the vehicle main body, so that vibrations are hardly generated, and therefore installing the radar installation portion at the fascia retainer can reduce the effect of vibrations upon the radar performance. The above-described fascia retainer therefore allows the radar main body to achieve stable radar performance.

The fascia retainer may have an elongated shape that extends in a front-back direction of the vehicle along an upper edge of a side part of the bumper fascia that extends along a side of the vehicle main body. The radar installation portion may be provided in the vicinity of the fixation portion. In the arrangement, a fascia retainer that can contribute to stable radar performance by the radar main body can be implemented.

According to the present invention, an automotive radar installation structure and a fascia retainer that allow a radar main body to be assembled to a vehicle in a simple arrangement and can contribute to stable radar performance can be provided.

DETAILED DESCRIPTION

Figure 1:
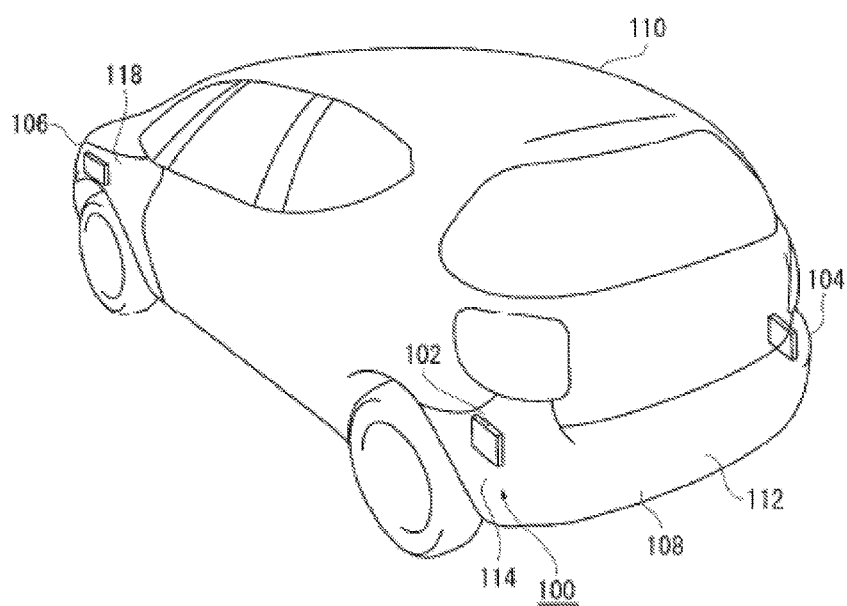
FIG. 1 is an exemplary view of a vehicle to which an automotive radar installation structure according to an embodiment of the invention is applied.

Now, a preferred embodiment of the present invention will be described in detail with reference to the accompanying drawings. Sizes, materials, and other specific numerical values in the following description of the embodiment are simply by way of illustration for better understanding of the present invention and should not be construed to limit the present invention unless otherwise specified. Note that in the description and drawings, elements having substantially identical functions or structures are designated by the same reference characters in order to avoid repetitive description, and elements that are not directly relevant to the present invention are not shown.

FIG. 1 is an exemplary view of a vehicle to which an automotive radar installation structure 100 according to an embodiment of the present invention is applied. The automotive radar 102 illustrated in FIG. 1 measures distances to other vehicles, obstacles, and so on from the vehicle and their positions relative to the vehicle by transmission and reception of radio waves. A plurality of automotive radars 102 are installed for example in the vicinity of the inner side of a rear bumper 104 at the rear of the vehicle and in the vicinity of the inner side of a front bumper 106 at the front of the vehicle. For example, two automotive radars 102 in total are installed on the side of the rear bumper 104, one at each end of the vehicle width-wise direction in the vehicle shown in FIG. 1. In the following, the automotive radar 102 installed at the rear bumper 104 on the left side of the vehicle will be described as an example. Automotive radars 102 are shown in FIG. 1 in their position behind a body panel, and are not externally visible.

Figure 2A:
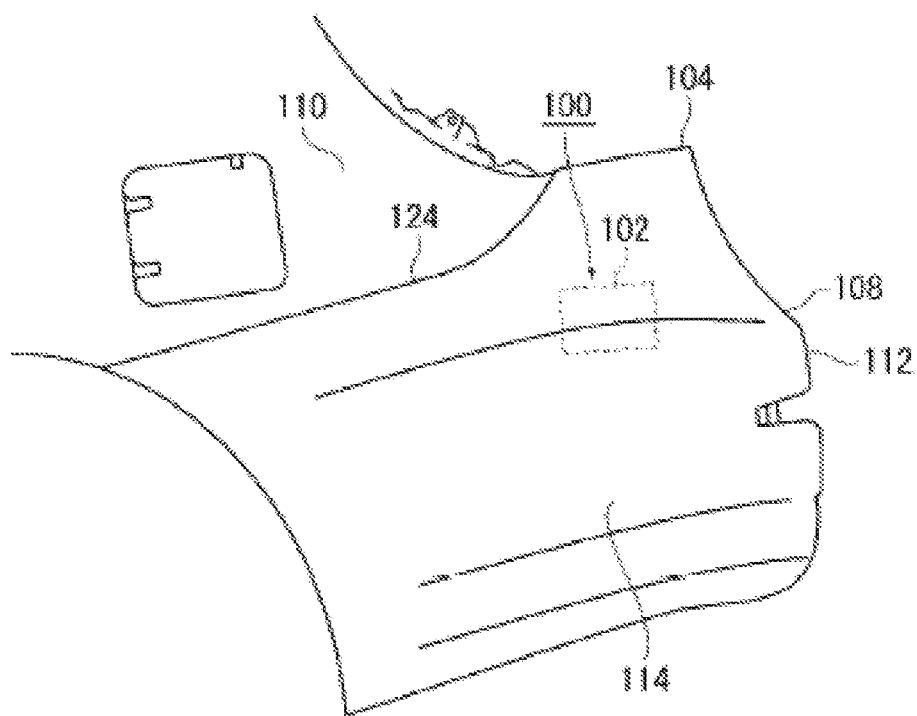
FIGS. 2(a) and 2(b) are exemplary views separately showing the automotive radar in FIG. 1.
Figure 2B:
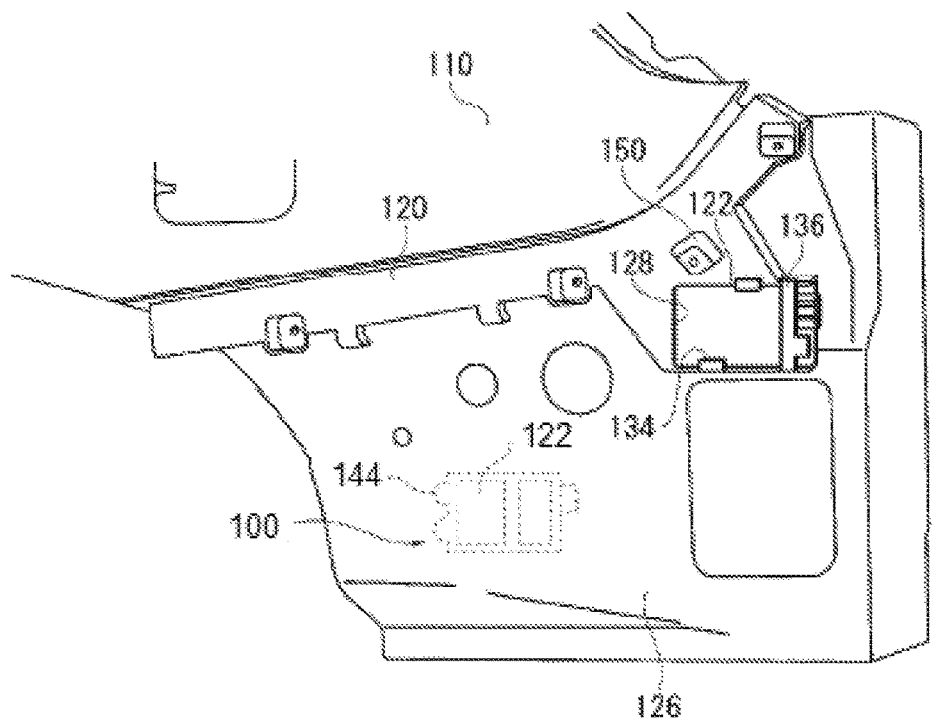

FIGS. 2(a) and 2(b) are exemplary views separately showing the automotive radar 102 in FIG. 1. FIG. 2(a) is an exemplary view of the rear bumper 104 in FIG. 1 as viewed from the left side of the vehicle. The rear bumper 104 includes a bumper fascia 108 as an exterior part. As illustrated in FIG. 1, the bumper fascia 108 has a front part 112 that extends in the vehicle width-wise direction along a rear surface of a vehicle main body 110, and a side part 114 that extends along a side of the vehicle main body 110 from each end of the front part 112. Note that similarly to the bumper fascia 108, a bumper facia 118 of the front bumper 106 on the front side of the vehicle also includes a front part along the front surface of the vehicle main body, and a side part along the side of the vehicle main body.

As illustrated in FIG. 2(a), the automotive radar 102 is assembled on the vehicle main body 110 on the inner side of the side part 114 of the bumper fascia 108 using the automotive radar installation structure 100 according to the embodiment. FIG. 2(b) is a view showing the the bumper fascia 108 shown in FIG. 2(a) removed from the vehicle main body 110. A fascia retainer 120 illustrated in FIG. 2(b) is a component that supports the bumper fascia 108. In the automotive radar installation structure 100, a radar main body 122 is fitted to the fascia retainer 120 for installation while it would be installed in the vehicle main body using a dedicated radar bracket in a conventional arrangement. More specifically, according to the embodiment, as the fascia retainer 120 additionally functions as a radar bracket, the parts count and man-hours for installation may be reduced.

The fascia retainer 120 is in an elongated shape that extends in a front-back direction of the vehicle along an upper edge 124 of the side part 114 of the bumper fascia 108 and assembled to a side panel 126 that forms a side of the vehicle main body 110. The inner side of the upper edge 124 of the bumper fascia 108 in FIG. 2(a) is connected to the fascia retainer 120, for example, by a stopper structure or a clip and is assembled to the vehicle main body 110 through the fascia retainer 120.

The fascia retainer 120 is used to secure a part of the bumper fascia 108 (see FIG. 2(a)) particularly in the vicinity of the upper edge 124 to the vehicle main body 110. The vibrations of the bumper fascia 108 are more favorably reduced in the vicinity of the fascia retainer 120. Therefore, relative vibrations between the radar main body 122 and the bumper fascia 108 are hardly generated in the vicinity of the fascia retainer 120, so that radar performance by the radar main body 122 can be more stable.

Figure 3A:
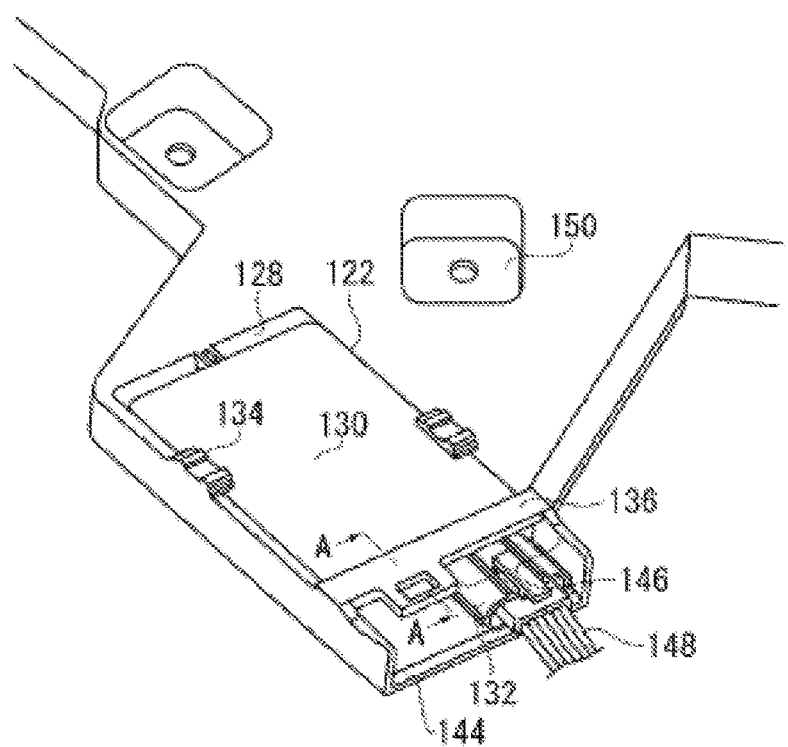
FIGS. 3(a) and 3(b) are enlarged views showing a part of a fascia retainer in FIG. 2(b) in the vicinity of a radar main body.

FIGS. 3(a) and 2(b) are enlarged views of a part of the fascia retainer 120 in FIG. 2(b) in the vicinity of the radar main body 122. As illustrated in FIG. 3(a), the fascia retainer 120 is provided with a radar installation portion 128, and the radar main body 122 is configured to be fitted into the radar installation portion 128. In this way, the radar main body 122 is installed so that a transmission and/or reception surface 130 for transmitting and/or its receiving radio waves faces outward in the vehicle width-wise direction.

Figure 3B:
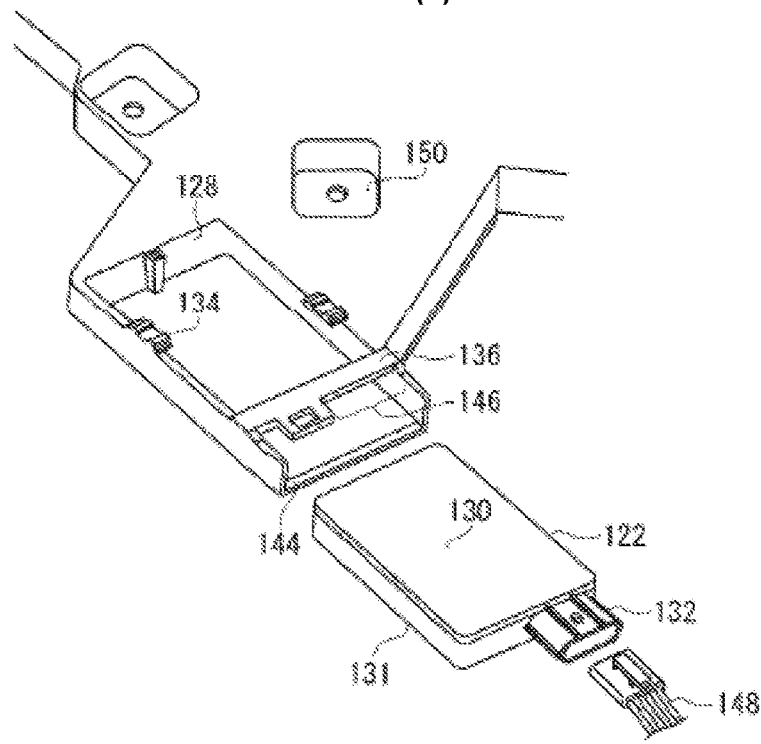

FIG. 3(b) is an exploded view of FIG. 3(a). The radar main body 122 described above is formed to have a flat solid shape, and the radar main body 122 is preferably a flat rectangular parallelepiped as illustrated in FIG. 3(b). The flat solid-shaped radar main body 122 is provided with the transmission and/or reception surface 130 on at least one plane thereof. The transmission and/or reception surface 130 corresponds to one of the two planes having the largest area in the flat regular parallelopiped. The radar main body 122 also has a connector 132 and is electrically connected to the vehicle main body 110 (see FIG. 1) by the connector 132 to transmit and/or receive radio waves to and/or from a target.

The radar installation portion 128 has a recessed shape corresponding to the radar main body 122 so that the radar main body 122 can be fitted therein. The radar installation portion 128 is provided with a plurality of supports adapted to support the fitted radar main body 122 in an immovable manner. The supports are implemented as stoppers 134 and a bridge portion 136.

Two stoppers 134 in total, one beside each side of the radar main body 122, are provided. The stopper 134 protrudes toward the center of the transmission and/or reception surface 130 of the radar main body 122 and supports the transmission and/or receiption surface 130 by contacting an edge of the surface. The bridge portion 136 extends over the radar main body 122 in the vicinity of an edge of the transmission and/or reception surface 130 on the side of the connector 132 and holds down the edge of the transmission and/or reception surface 130 on the side of the connector 132.

The stoppers 134 and the bridge portion 136 are both configured to support the edge rather than the center of the transmission and/or reception surface 130, so that their interference with radio waves transmitted or received by the transmission and/or reception surface 130 can be reduced. Since these stoppers 134 and bridge portion 136 are used, a large part of the transmission and/or reception surface 130 of the radar main body 122 is left uncovered, and the radar installation portion 128 allows the radar main body 122 to achieve sufficient radar performance, and can also fully support the radar main body 122 so that the radar main body does not come off. Alternatively, the supports may be implemented as ribs adapted to support the sides of the radar main body 122.

Figure 4:
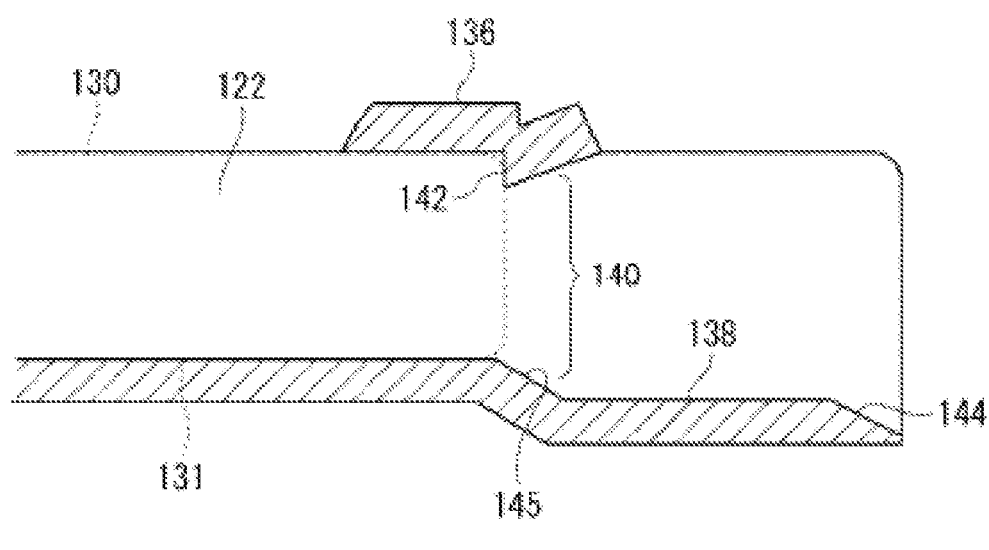
FIG. 4 is a sectional view taken along line A-A in FIG. 3(a).

FIG. 4 is a sectional view taken along A-A in FIG. 3(a). As illustrated in FIG. 4, an insertion opening 140 is formed between the bridge portion 136 and a bottom 138 of the radar installation portion 128. The radar main body 122 is inserted from the insertion opening 140 in a direction parallel to the transmission and/or reception surface 130. The size of the opening 140, more specifically the distance from the bridge portion 136 to a part of the bottom 138 immediately thereunder is slightly smaller than the thickness of the radar main body 122 so that the radar main body 122 can be held therebetween. A protrusion 142 formed to engage the fully inserted radar main body 122 is provided at the part of the bridge portion 136 on the side of the bottom 138 so that the inserted radar main body 122 does not come off.

While the radar installation portion 128 has the opening 140 set to the above-described size and the protrusion 142 that protrudes toward the radar main body 122, the radar main body 122 can be inserted without difficulties. For the purpose, the bottom 138 is provided with two slopes or bevels 144 and 145. These slopes 144 and 145 are provided to guide the radar main body 122 further into the insertion opening 140, the slope 144 is provided at an entrance side end of the bottom 138, and the slope 145 is provided in a location under the bridge portion 136 where the height of bottom 138 is raised.

To start with, when the radar main body 122 is inserted from the insertion opening 140, a back surface 131 on the reverse side of the transmission and/or reception surface 130 of the radar main body 122 contacts the bottom 138, so that the back surface 131 slides on the bottom 138. During the sliding, the radar main body 122 moves onto the slope 145 provided near the location under the bridge portion 136 and thus has an inclined position so as to avoid the protrusion 142. The slope 144 is provided at the entrance side end of the bottom 138 so that the radar main body 122 can optimally take the inclined position, and the inclined radar main body 122 is thus free from interference. In this way, the radar installation portion 128 is provided with the slopes 144 and 145 so that the radar main body 122 can be smoothly inserted and held by the bridge portion 136 and the bottom 138.

Now, referring back to FIG. 3(a), the bridge portion 136 is provided with a cut 146 so that the connector 132 of the inserted radar main body 122 is exposed. Through the cut 146, a wiring cord 148 or other cords can be optimally detached and attached from and to the connector 132 even after the radar main body 122 is fitted in the radar installation portion 128.

According to the embodiment, the radar installation portion 128 is provided in the vicinity of a fixation portion 150 of the fascia retainer 120, so that the radar main body 122 can stably achieve its radar performance. The fixation portion 150 is a part fixed to the side panel 126 (FIG. 2(b)) using for example a bolt or a clip. In the fascia retainer 120, the part in the vicinity of the fixation portion 150 in particular is hardly affected by the vibrations of the bumper fascia 108 while the vehicle travels. Therefore, providing the radar installation portion 128 in the vicinity of the location can reduce the effect of vibrations on the radar main body 122.

In the following, advantageous effects of the automotive radar installation structure 100 according to the embodiment will be described in comparison with a comparative example. FIG. 5 shows results of measurements of vibrations exerted on radar main bodies in the automotive radar installation structure 100 according to the embodiment and the comparative example during vehicle traveling. As shown in phantom in FIG. 2(b), in the comparative example, a radar main body 12 is assembled using a radar bracket 14 in the vicinity of the center of the side panel 126 in the vertical and horizontal directions of the vehicle on the inner side of the side part 114 of the bumper fascia 108 (see FIG. 2(a)).

Figures 5A, 5B:
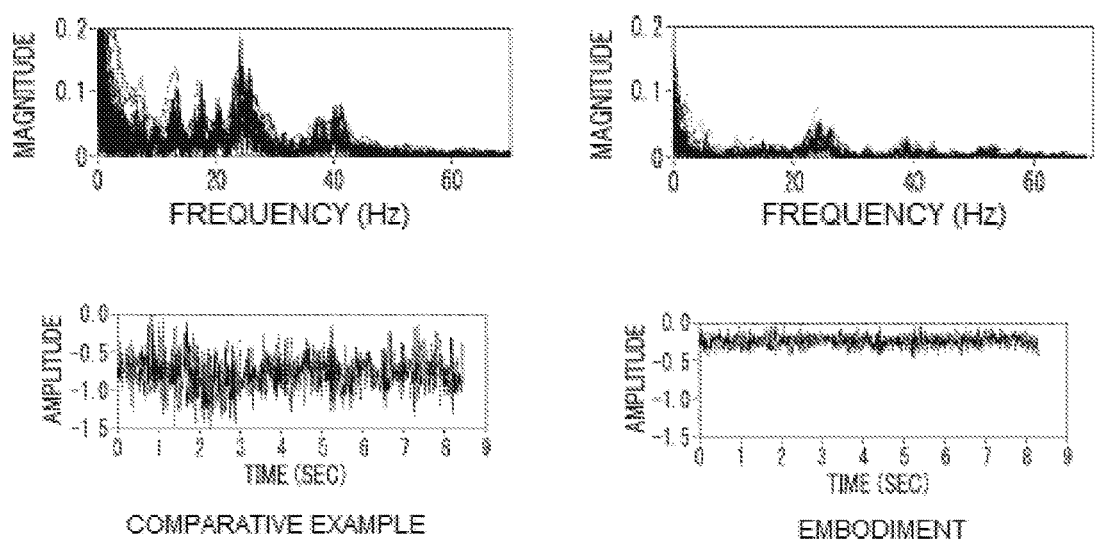
FIGS. 5(a) and 5(b) show results of measurements of vibrations exerted on radar main bodies in the automotive radar installation structure according to the embodiment and a comparative example during vehicle traveling.

In the measurement tests in FIG. 5(a), vibrations exerted on the radar main bodies when the vehicle travelled at 120 km were measured. Among the graphs for the embodiment and the comparative example, the upper graphs show results of spectral analysis, where the abscissa represents frequencies and the ordinate represents values related to shaking energy at the frequencies. In the lower graphs, the abscissa represents time and the ordinate represents vibration output values at the time. The results in these graphs are summarized into a table shown in FIG. 5(b). As shown in FIG. 5(b), a peak-to-peak value in amplitude (the difference between the maximum and minimum values) was about −0.5 mm according to the embodiment, and about −1.5 mm in the comparative example, i.e., the peak-to-peak value according to the embodiment was about one third of that in the comparative example.

As described above, according to the embodiment, the radar installation portion for the radar main body is integrally provided in the vicinity of the fixation portion of the fascia retainer, so that the radar performance can be less affected by vibrations as compared to the comparative example in which the radar main body is assembled to the vehicle using the radar bracket as a separate part. In addition, the structure is simple as compared to the comparative example, and therefore the man-hours for assembling may be reduced. Therefore, the structure is significantly advantageous both in view of performance and cost.

Figure 6A:
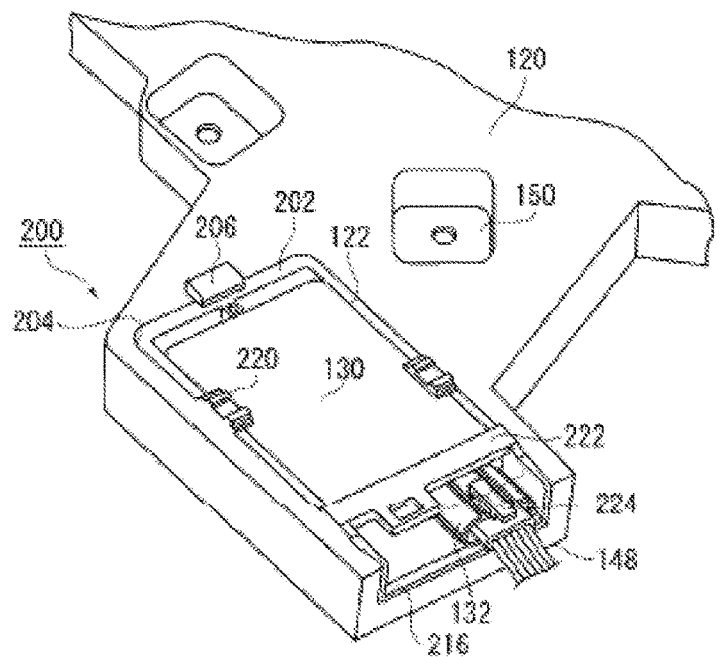
FIGS. 6(a) and 6(b) are exemplary views of a modification of the automotive radar illustrated in FIGS. 3(a) and 3(b).
Figure 6B:
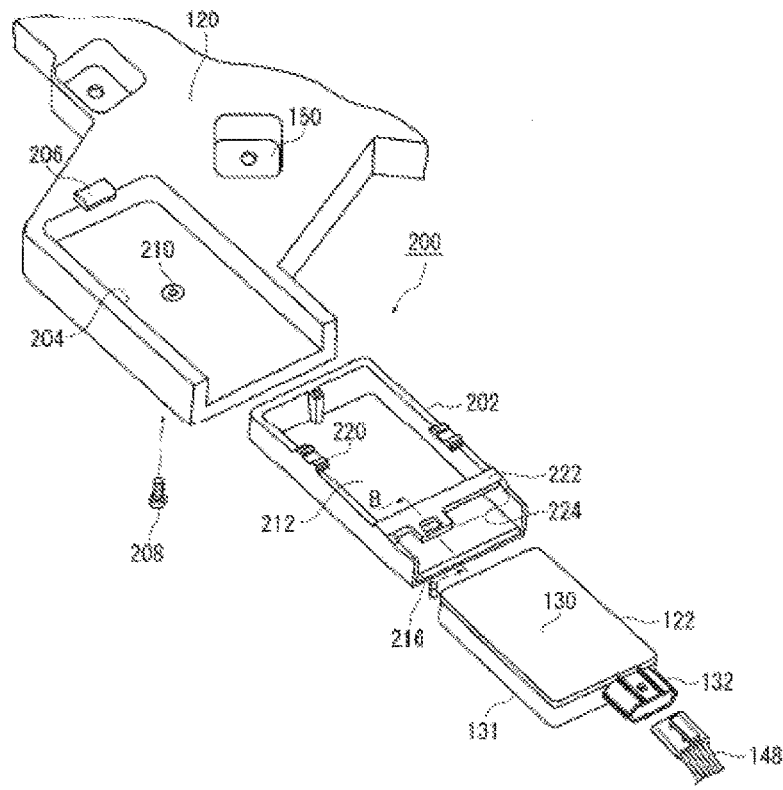

FIGS. 6(a) and 6(b) show a modification of the automotive radar 102 illustrated in FIG. 3. FIG. 6(a) is an exemplary view of an automotive radar 200 as a modification corresponding to FIG. 3(b). The automotive radar 200 illustrated in FIG. 6(a) is different from the structure of the automotive radar 102 in FIG. 3(a) in that the former includes a case 202 that stores a radar main body 122 and the radar main body 122 is assembled to a radar installation portion 204 through the case 202. Note that in the following, elements already described with reference to FIGS. 1 to 5 are designated by the same reference characters, and a repeated description of these elements shall be omitted.

The automotive radar system 200 measures distances to other vehicles, obstacles, and so on from the vehicle and their positions relative to the vehicle by transmission and reception of radio waves similarly to the automotive radar 102 in FIG. 3(a). A plurality of automotive radars 200 can be installed for example in the vicinity of the inner side of the rear bumper 104 at the rear of the vehicle (see FIG. 1) and the inner side of the front bumper 106 at the front of the vehicle. It is assumed that the automotive radar 200 is installed at the rear bumper 104 on the left side of the vehicle and assembled on the vehicle main body 110 on the inner side of the side part 114 of the bumper fascia 108 similarly to the automotive radar 102 in FIG. 1.

The radar installation portion 204 is provided at the fascia retainer 120, and the radar main body 122 is configured to be fitted therein through the case. FIG. 3(b) is an exploded view of the automotive radar in FIG. 3(a). As illustrated in FIG. 3(b), the case 202 having the radar main body 122 stored therein is fitted into the radar installation portion 204 unlike the radar installation portion 128 into which the radar main body 122 illustrated in FIG. 3(b) is directly fitted. The radar installation portion 204 therefore has a recessed shape corresponding to the outer shape of the case 202. The radar installation portion 204 is provided with parts necessary for assembling the case 202 as required such as a hook 206 used to hold the case 202 and a tapped hole 210 used to fasten the case 202 with a screw 208.

The case 202 directly supports the radar main body 122 and is fitted into the radar installation portion 204. The case 202 is formed using a material such as a resin. In this modification, the case 202 has stoppers 220 and a bridge portion 222 that serve as supports for the radar main body 122 unlike the automotive radar 102 in FIG. 3(b).

Two stoppers 220 in total, one beside each side of the radar main body 122, are provided and support the transmission and/or reception surface 130 by contacting the edge of the surface. The bridge portion 222 extends over the radar main body 122 in the vicinity of the edge of the transmission and/or reception surface 130 on the side of the connector 132 and holds down the edge of the transmission and/or reception surface 130 on the side of the connector 132. These stoppers 220 and bridge portion 222 are configured to support the edge rather than the center of the transmission and/or reception surface 130, so that their interference with radio waves transmitted or received by the transmission and/or reception surface 130 is reduced. The use of these stoppers 220 and bridge portion 222 allows a large part of the transmission and/or reception surface 130 of the radar main body 122 to be left uncovered, and therefore the the case 202 and the radar installation portion 204 allow the radar main body 122 to achieve sufficient radar performance, and can fully support the radar main body 122 so that the radar main body does not come off. Alternatively, the supports may be implemented as ribs adapted to support the sides of the radar main body 122.

The bridge portion 222 is provided with a cut 224 so that the connector 132 of the inserted radar main body 122 is exposed. Through the cut 224, a wiring cord 148 or other cords can be optimally detached and attached from and to the connector 132, even after the radar main body 122 is stored in the case 202.

Figure 7:
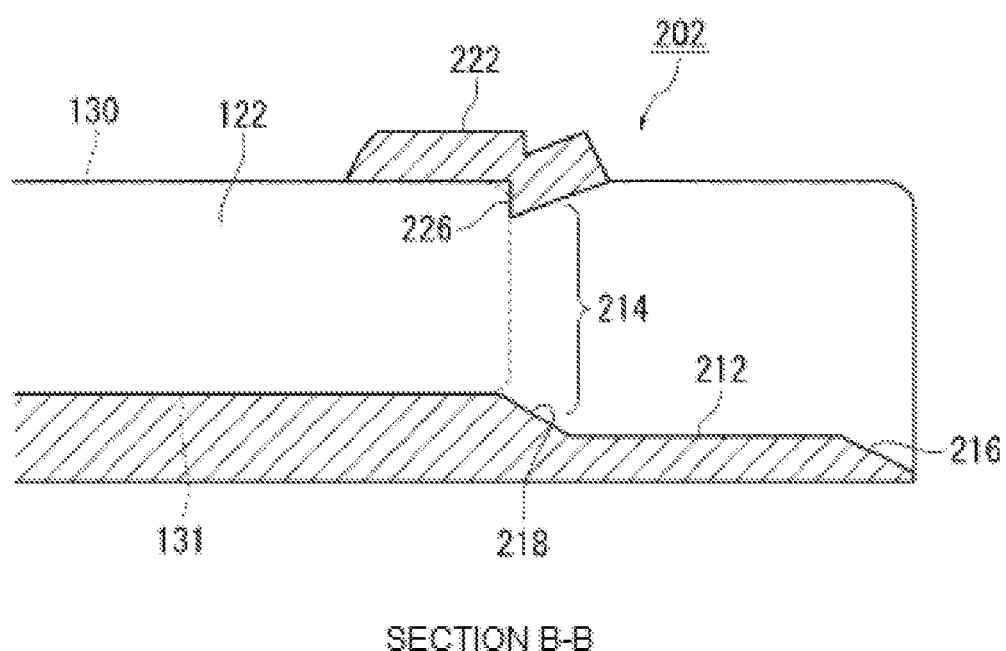
FIG. 7 is a sectional view taken along line B-B in FIG. 6(b).

FIG. 7 is a sectional view taken along line B-B in FIG. 6(b). As illustrated in FIG. 7, an insertion opening 214 is formed between the bridge portion 222 and a bottom 212 of the case 202. The radar main body 122 is inserted from the insertion opening 214 in a direction parallel to the transmission and/or reception surface 130. The size of the insertion opening 214, more specifically the distance from the bridge portion 222 to a part of the bottom 212 immediately thereunder is slightly smaller than the thickness of the radar main body 122 so that the radar main body 122 can be held therebetween. A protrusion 226 formed to engage the fully inserted radar main body 122 is provided on a part of the bridge portion 222 on the side of the bottom 212 so that the inserted radar main body 122 does not come off.

The bottom 212 is provided with two slopes (or bevels) 216 and 218. These slopes 216 and 218 are provided to guide the radar main body 122 further into the insertion opening 214, and the slope 216 is provided at the entrance side end of the bottom 212 and the slope 218 is provided in a location below the bridge portion 222 where the height of bottom 212 is raised.

When the radar main body 122 is inserted from the insertion opening 214, a back surface 131 on the reverse side of the transmission and/or reception surface 130 of the radar main body 122 contacts the bottom 212, so that the back surface 131 slides on the bottom 212. During the sliding, the radar main body 122 moves onto the slope 218 provided near a location under the bridge portion 222 and thus has an inclined position so as to avoid the protrusion 226. The slope 216 is provided at the entrance side end of the bottom 212, so that the radar main body can optimally take the inclined position, and the inclined radar main body 122 is thus free from interference. In this way, the case 202 is provided with the slopes 216 and 218, so that the radar main body 122 can be smoothly inserted and held by the bridge portion 222 and the bottom 212.

Also in this modification, the radar installation portion 204 is provided in the vicinity of the fixation portion 150 of the fascia retainer 120 so that the radar main body 122 can stably achieve its radar performance. The fixation portion 150 is a part to be fixed to the side panel 126 (FIG. 2(b)) using for example a bolt or a clip. In the fascia retainer 120, the part in the vicinity of the fixation portion 150 in particular is hardly affected by the vibrations of the bumper fascia 108 while the vehicle travels. Therefore, providing the radar installation portion 128 in the vicinity of the location can reduce the effect of the vibrations upon the radar main body 122.

While the above description constitutes the preferred embodiment of the present invention, it will be appreciated that the invention is susceptible to modification, variation and change without departing from the proper scope and fair meaning of the accompanying claims.

The invention claimed is:

1. An automotive radar installation structure for a vehicle, comprising:
    a radar main body formed in a flat solid shape and having a transmission surface or a reception surface provided at one surface of the body to transmit or receive radio waves; and
    a fascia retainer used to attach a bumper fascia to a vehicle main body of the vehicle, the bumper fascia being an exterior part of a bumper at a rear surface or a front surface of the vehicle main body,
    the fascia retainer including a fixation portion fixed to the vehicle main body, and a radar installation portion having a recessed shape into which the radar main body is fitted so that the transmission surface or the reception surface faces outward of the vehicle, the radar installation portion includes at least one support that supports the radar main body in an immovable manner by contacting an edge of the transmission surface or the reception surface or a side of the radar main body.

2. The automotive radar installation structure according to claim 1, further comprising the bumper fascia includes a front part that extends in a vehicle width-wise direction along the front surface or the rear surface of the vehicle main body, and a side part that extends from each end of the front part along a side of the vehicle main body, and
    the fascia retainer has an elongated shape that extends in a front-back direction of the vehicle along an upper edge of the side part of the bumper fascia.

3. The automotive radar installation structure according to claim 1, further comprising the radar installation portion is provided in a vicinity of the fixation portion.

4. The automotive radar installation structure according to claim 1, further comprising the support includes a stopper that holds down the edge of the transmission surface or the reception surface or the side of the radar main body.

5. The automotive radar installation structure according to claim 1, further comprising the support includes a bridge portion that extends over the radar main body and holds down the edge of the transmission surface or the reception surface.

6. The automotive radar installation structure according to claim 1, further comprising the radar installation portion includes:
    an insertion opening from which the radar main body is inserted in a direction parallel to the transmission surface or the reception surface; and
    a slope provided in a prescribed location of a bottom in contact with a back surface of the radar main body on an opposite side to the transmission surface or the reception surface to guide the radar main body further into the insertion opening in an insertion direction.

7. The automotive radar installation structure according to claim 1, further comprising a case that stores the radar main body, wherein the radar main body is fitted into the radar installation portion through the case.

8. The automotive radar installation structure according to claim 7, further comprising the case forms the at least one support.

9. The automotive radar installation structure according to claim 8, further comprising the support includes a stopper that holds down the edge of the transmission surface or the reception surface or the side of the radar main body.

10. The automotive radar installation structure according to claim 8, further comprising the support includes a bridge portion that extends over the radar main body and holds down the edge of the transmission surface or the reception surface.

11. The automotive radar installation structure according to claim 7, further comprising the case includes:
    an insertion opening from which the radar main body is inserted in a direction parallel to the transmission surface or the reception surface; and
    a slope provided in a location of a bottom in contact with a back surface of the radar main body on an opposite side to the transmission surface or the reception surface to guide the radar main body further into the insertion opening in an insertion direction.

12. A fascia retainer used to attach a bumper fascia to a main body of a vehicle, the bumper fascia being an exterior part of a bumper at a rear surface or a front surface of the vehicle, the fascia retainer comprising:
   a fixation portion fixed to the vehicle main body; and
   a radar installation portion having a recessed shape into which a radar main body is fitted so that a transmission surface or a reception surface of the radar main body in a flat solid shape faces outward of the vehicle, the radar installation portion includes at least one support that supports the radar main body in an immovable manner by contacting an edge of the transmission surface or the reception surface or a side of the radar main body.

13. The fascia retainer according to claim 12, further comprising the fascia retainer has an elongated shape that extends in a front-back direction of the vehicle along an upper edge of a side part of the bumper fascia that extends along a side of the vehicle main body.

14. The fascia retainer according to claim 12, further comprising the radar installation portion is provided in a vicinity of the fixation portion.

15. The automotive radar installation structure according to claim 1, further comprising the radar main body is mounted under the bumper fascia exterior part when the radar main body is fitted into the fixation portion.

16. The fascia retainer according to claim 12, further comprising the radar main body is mounted under the bumper fascia exterior part when the radar main body is fitted into the fixation portion.

* * * * *